United States Patent [19]

Okuda

[11] 4,136,532
[45] Jan. 30, 1979

[54] DRIVE SHAFT

[75] Inventor: Hiroji Okuda, Nara, Japan

[73] Assignee: Koyo Seiko Company Limited, Osaka, Japan

[21] Appl. No.: 819,218

[22] Filed: Jul. 25, 1977

[51] Int. Cl.² ............................ F16D 3/06; F16D 3/26
[52] U.S. Cl. ...................................... 64/23; 64/17 R; 64/17 SP; 64/1 C
[58] Field of Search ............... 64/23, 17 R, 17 SP, 64/1 C, 9 R

[56] References Cited

U.S. PATENT DOCUMENTS

| | | | |
|---|---|---|---|
| 2,032,496 | 3/1936 | Pearce | 64/17 R |
| 2,107,721 | 2/1938 | Swenson | 64/23 |
| 3,069,875 | 12/1962 | Crum | 64/23 |
| 3,633,383 | 1/1972 | Kleinschmidt | 64/23 |
| 3,940,948 | 3/1976 | Schultenkämper | 64/17 R |
| 3,942,336 | 3/1976 | Schultenkämper | 64/23 |

Primary Examiner—Samuel Scott
Assistant Examiner—R. C. Turner
Attorney, Agent, or Firm—Mason, Fenwick & Lawrence

[57] ABSTRACT

Fitting yokes are coupled each by a universal joint of the trunnion type to the opposite ends of a shaft assembly biased for axial extension. Each of the fitting yokes has a sleeve inserted in a center bored portion of the universal joint with a clearance formed therebetween to permit relative angular displacement between the axis of the shaft assembly and the axis of the fitting yoke. The drive shaft therefore has a greatly reduced length in its entirety. The shaft assembly includes a splined portion adapted to permit collapsing and extension of the assembly and circumferentially covered with a sleeve-shaped cover. The cover defines an interior space holding a lubricant to lubricate the spline portion for sliding movement.

5 Claims, 6 Drawing Figures

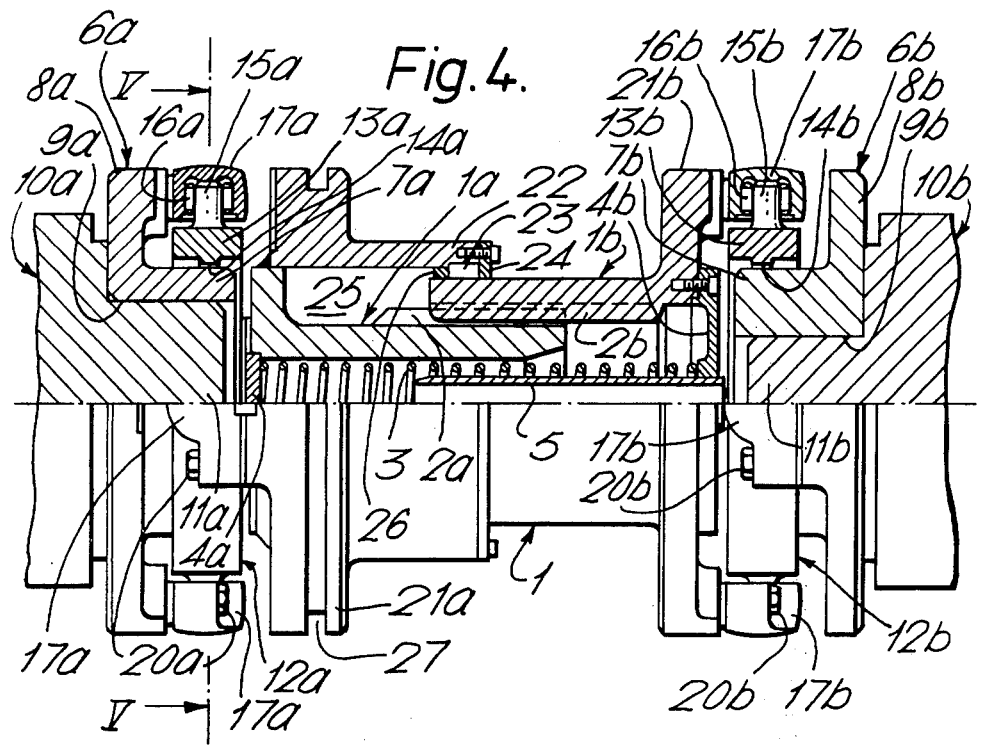

DRIVE SHAFT

BACKGROUND OF THE INVENTION

The present invention relates to a drive shaft, and more particularly to a drive shaft suitable for use as power transmission means for rolling mills.

With a rolling mill as shown in FIG. 1, a plurality of rolls $B_1$, $B_2$, $B_3$, $B_4$ arranged in a row are driven by single drive means A through drive shafts $C_1$, $C_2$, $C_3$ interconnecting the drive means and the rolls. Since the spacing L between the adjacent rolls in this arrangement is very small, couplings a as shown in FIGS. 2 and 3 are usually used in the interconnecting drive shafts $C_1$, $C_2$, $C_3$ to connect a drive shaft element b, a driven shaft element c and an intermediate shaft element d together.

In the case of such rolling mills, the level of the roller during rotation undergoes delicate variations, so that the shaft elements b, c, d of the drive shaft must be adapted for angular displacement. For this purpose, clearances $S_1$ are provided between the couplings a and shaft element b, c, d fitting therein, while clearances $S_2$ are also provided between the opposed ends of the shaft elements b, c, d. However, when the shaft elements are thus loosely fitted in the couplings, the intermediate shaft element d during the rotation of the drive shaft undergoes vibration in the direction of the rotation and oscillation in the axial direction, giving rise to wear on the surfaces of the coupling a and the shaft elements b, c, d. in fitting contact with each other. Moreover, the vibration and oscillation will be delivered to the rolls and other portions of the rolling mill, consequently reducing the accuracy of the rolling operation and causing damage to the mechanical parts early. Presumably, these problems can be overcome if the intermediate shaft element d is provided, at its opposite ends, with universal joints of the trunnion type which permit a free angular displacement, such that fitting yokes on the universal joints are connected to the drive shaft element b and to the driven shaft element c, but this arrangement renders the drive shaft excessively great in its overall length and is not usable in rolling mills in which the roll-to-roll spacing L is limited as already stated. Additionally, the drive shaft as shown in FIGS. 2 and 3 involves difficulty in providing constant lubrication to the fitting portions.

SUMMARY OF THE INVENTION

An object of this invention is to provide a drive shaft basically free of the foregoing problems and incorporating universal joints of the trunnion type, the drive shaft having a greatly reduced overall length and well-suited for use in drive systems involving an extremely limited roll-to-roll spacing.

Another object of this invention is to provide an axially slidable portion which can be lubricated in a stable fashion over a prolonged period of time.

Still another object of this invention is to provide a drive shaft having a greatly reduced overall length as described above and possessing a high ability to absorb the vibration and oscillation resulting from its rotation.

The drive shaft of this invention comprises a shaft assembly, fitting yokes adjacent the axially opposite ends of the shaft assembly and fittable to a drive shaft element and a driven shaft element respectively for rotation therewith, each of the fitting yokes having a flange and a sleeve extending from the flange toward the corresponding end of the shaft assembly, and annular joint members each providing a universal joint of the trunnion type and receiving in the inner opening thereof the sleeve of the fitting yoke angularly displaceably. When the ends of the drive and driven shaft elements are fitted in the sleeves of the fitting yokes, the shaft ends are positioned in the inner openings of the annular joint members.

Accordingly, as compared with drive shafts including conventional trunnion-type universal joints, the drive shaft of this invention has an overall length which is shorter at least by an amount corresponding to the combined axial lengths of the two joint members and is therefore well-suited for use in rolling mills in which the roll-to-roll spacing L is limited as illustrated in FIG. 1.

The shaft assembly, the main portion of the drive shaft of this invention, comprises two shaft members which are splined to each other to render the drive shaft axially collapsible and extensible. One of the shaft members is provided with a cover slidable on the outer periphery of the other shaft member and covering the splined portion. The cover defines a closed space for holding a lubricant, which lubricates the slidable splined portion of the shaft assembly in a stable fashion over a prolonged period. The lubrication thus afforded assures that the drive shaft to be exposed to scale and coolant will operate with high stability over a long period of time.

Other objects and features of this invention will become more apparent from the following description.

BRIEF DESCRIPTION OF THE DRAWINGS

FIG. 4 is a view partly in vertical section showing an embodiment of this invention;

FIG. 5 is a view in cross section taken along the line V—V in FIG. 4; and

FIG. 6 is a fragmentary enlarged view in vertical section showing the main part only of another embodiment of this invention.

DESCRIPTION OF THE PREFERRED EMBODIMENTS

Figure 1:
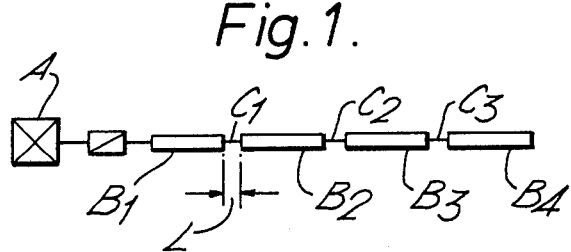
FIG. 1 is a diagram showing the arrangement of rolling rolls in a rolling mill in which the drive shaft of this invention is particularly suitable for use.
Figure 2:
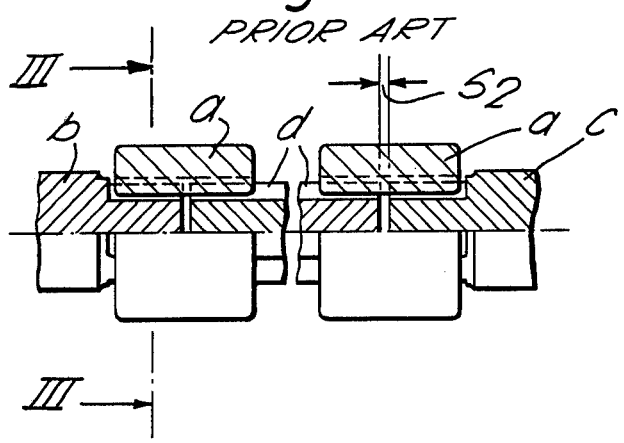
FIG. 2 is a view partly in vertical section showing a conventional drive shaft.
Figure 3:
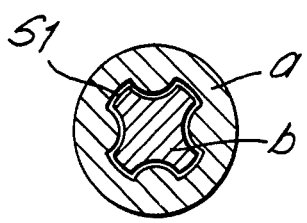
FIG. 3 is a view in cross section taken along the line III—III in FIG. 2.

With reference to FIGS. 4 and 5 showing an embodiment of this invention, two tubular shaft members 1a, 1b constitute the main body of a drive shaft. The shaft member 1a has on its outer peripheral surface a splined portion 2a which fits in a splined portion 2b on the inner peripheral surface of the other shaft member 1b. The shaft members 1a, 1b are in alignment with and axially slidable on each other, are rotatable together in the direction of rotation of the drive shaft, and provides a shaft assembly 1. The shaft assembly 1 accommodates a coiled spring 3 having one end bearing against a closure plate 4a secured to the bottom of the shaft member 1a and the other end bearing against another closure plate 4b secured to the bottom of the shaft member 1b. The coiled spring 3 biases the two shaft members 1a, 1b away from each other axially thereof, thus acting to extend the shaft assembly 1. A tube 5 has one end extending into the shaft member 1a and the other end secured to the closure plate 4b. The tube 5 functions to support the spring 3 in its stable position and also keeps the space defined by the inner surfaces of the tubular shaft members 1a, 1b in communication with the atmosphere, the tube thus permitting the shaft members 1a, 1b to axially move toward or away from each other without producing variations in air pressure within the space. Fitting yokes 6a, 6b have flanges 8a, 8b, sleeves 7a, 7b extending from the inner peripheries of the flanges toward the corresponding shaft members 1a, 1b, and inner bores 9a, 9b respectively. Two rotary shaft elements 10a, 10b, one serving as a drive shaft element and the other as a driven shaft element, are fittable at their shaft ends 11a, 11b into the sleeves 7a, 7b, i.e. into the bores 9a, 9b, from the flanged sides 8a, 8b. When the shaft ends 11a, 11b are thus fitted in place, the rotary shaft elements 10a, 10b are in alignment with and rotatable with the corresponding sleeves 7a, 7b respectively. Although the bores 9a, 9b have a rectangular cross sectional shape having opposed circular arc ends as seen in FIG. 5, the bores may have any cross section in the form of a quadrilateral, star or circle having a cutout for a key, insofar as the abovementioned functions are achievable. Universal joints 12a, 12b coupling the shaft members 1a, 1b to the corresponding fitting yokes 6a, 6b respectively include rings 13a, 13b, serving as joint members and mounted externally on the sleeves 7a, 7b. The rings 13a, 13b are coaxial with the corresponding sleeves 7a, 7b respectively with a slight clearance formed between the inner peripheral surface of each ring and the outer peripheral surface of the corresponding sleeve as illustrated. Each of the clearances 14a, 14b permits relative angular displacement between the center axis of each of the rings 13a, 13b and the center axis of the corresponding sleeve. Each of the rings 13a, 13b has four solid cylindrical pins (15a or 15b) extending radially outward from its outer periphery and equidistantly arranged at angular spacing of 90° about the center of the ring. Each of the pins 15a, 15b carries thereon a cap-shaped housing (17a or 17b) with a roller bearing (16a or 16b) provided therebetween. The housings 17a, 17b are freely rotatable about the corresponding pins 15a, 15b respectively. Since the pins 15a, 15b are cylindrical, the housings 17a, 17b are reversibly rotatable about the pins 15a, 15b as indicated by arrows in FIG. 5. As shown in FIG. 6, a pin 18a is also usable according to this invention. The pin 18a has a rectangular section having a greater dimension in the direction of the center axis of the ring 13a and is provided with a circular arc top surface 18c. In this case, the pin 18a has a housing 19a embracing the pin over the opposite side ends of the pin 18a circumferentially of the ring 13a. The housing 19a is movable to and fro over the top end of the pin 18a along a circular arc path as indicated by arrows in FIG. 6. Throughout FIGS. 4, 5 and 6, like parts are referred to by like reference numerals. According to this invention, the housing can be provided directly over the pin without interposing a rolling member such as a roller bearing therebetween, as is the case with a ball-and-socket joint. The housing serves as a socket in which the pin acting as a ball is movable.

Of the four housings 17a on the ring 13a, two opposed housings 17a (those shown on the left and right of FIG. 5 in horizontally opposed relation to each other) are secured by bolts 20a to a flange portion 21a provided on an outer peripheral end part of the shaft member 1a. The other two opposed housings 17a (those vertically opposed in FIG. 5) are secured by bolts 20a to the flange 8a of the fitting yoke 6a. The four housings 17b on the ring 13b are also similarly secured in place; two opposed housings 17b are secured by bolts 20b to a flange portion 21b on an outer peripheral end part of the shaft member 1b, while the other two opposed housings 17b are secured by bolts 20b to the flange 8b of the fitting yoke 6b. Since the two shaft members 1a, 1b are coupled to the corresponding fitting yokes 6a, 6b by the universal joints 12a, 12b respectively, the free motion of the housings about the corresponding pins permits the relative angular displacement between the axis of each of the shaft members 1a, 1b and the center axis of the corresponding rotary shaft 10a or 10b during the rotation of the drive shaft.

A sleeve-shaped cover 22 extends from the flange 21a toward the shaft member 1b and terminates at an outer peripheral forward portion of the shaft member 1b. A seal 23 is provided in a clearance between the inner peripheral surface of the forward end of the cover 22 and the outer peripheral surface of the shaft member 1b. The seal 23 is retained in place by a stop ring 24 secured to the extremity of the cover 22. The cover 22 is axially movable with the shaft member 1a. Since the forward end of the cover 22 is sealed as above, the cover 22 defines a closed space 25 around the shaft member 1a in which space 25 accommodates the fitting portion of the shaft member 1a, namely the splined portion 2a which is exposable by the shaft member 1b owing to the axial sliding displacement of the shaft member 1b relative to the shaft member 1a. A suitable lubricant (not shown) is held in the space 25. The lubricant is applied to the sliding surfaces of the splined portions 2a, 2b. The shaft assembly 1 may be provided with a port (not shown) for feeding the lubricant. The shaft member 1b is formed on the outer periphery of its forward end with an annular projection 26 which, by engagement with the seal 23, holds the two shaft members 1a, 1b in fitting engagement with each other. Since the two shaft members 1a, 1b are merely biased by the coiled spring 3, the fitting yoke 6a is detachable from the rotary shaft element 10a for example by engaging a suitable member (not shown) into a groove 27 formed in the outer periphery of the flange 21a and forcing the shaft member 1a toward the shaft member 1b to thereby collapse the shaft assembly 1. The drive shaft is therefore mountable on and detachable from a rolling roll with extreme ease.

According to this invention the drive shaft is rotatable free of any vibration and oscillation, because the shaft assembly 1 composed of two shaft members 1a, 1b slidably fitted together is axially biased for extension at all times, with the fitting yokes 6a, 6b intimately fitted around the ends 11a, 11b of the rotary shaft elements. Futhermore, the drive shaft is made fully amenable to any angular displacement of the rotary shaft elements which will take place during the rotation of the shaft, by the construction in which the two shaft members 1a, 1b, splined to each other, are connected to the corresponding fitting yokes 6a, 6b by the universal joints 12a, 12b.

What is claimed is:
1. A drive shaft comprising:
a shaft assembly including two shaft members aligned with and axially slidably splined to each other, the shaft members being axially biased away from each other,
two fitting yokes respectively adjacent the opposite ends of the shaft assembly toward which the shaft assembly is extensible, each of the fitting yokes having a flange and a sleeve extending from the flange toward the shaft assembly and having a center bore for fittingly receiving therein one end of a drive shaft element or of a driven shaft element in alignment with the sleeve, the fitting yoke being rotatable with the shaft element in the direction of rotation of the shaft element.

two annular joint members each surrounding the sleeve of the corresponding yoke and coaxial with the sleeve with a suitable clearance formed therebetween, each of the annular joint members having four pins extending radially outward from its outer periphery and equidistantly arranged at angular spacing of 90° about the center of the joint member, the clearance having such a dimension as to permit the displacement of the center axis of the annular joint member relative to the center axis of the sleeve during the rotation of the drive shaft, and housings mounted on the pins on each annular joint member and freely movable in a direction allowed by the pins, the housings being arranged in opposed pairs on diametrical lines at right angles to each other, one pair of the housings being secured to a flange portion provided at the end of the shaft assembly, the other pair of the housings being secured to the flange of the fitting yoke.

2. A drive shaft assembly as defined in claim 1 wherein each pin on the annular joint member is a solid cylinder extending radially of the joint member, and a roller bearing is provided between the pin and the housing.

3. A drive shaft assembly as defined in claim 1 wherein each pin on the annular joint member is in the form of a pillar of rectangular section and has a circular arc top surface extending along the center axis of the annular joint member, each of the housings embracing the pin over the opposite side ends of the pin circumferentially of the joint member so as to permit relative intersection between the center axis of the shaft assembly and the center axis of each of the fitting yoke.

4. A drive shaft as defined in claim 1 further comprising:

a sleeve-shaped cover secured to one of the shaft members of the shaft assembly and extending over an outer peripheral portion of the other shaft member, the cover surrounding the splined portion to define a space therein for holding a lubricant, and means provided between the cover and the other shaft member to seal off the lubricant holding space.

5. A drive shaft as defined in claim 4 wherein the flange portion having secured thereto said one pair of the housings on the annular joint member is provided on the cover.

* * * * *